Figure 1:
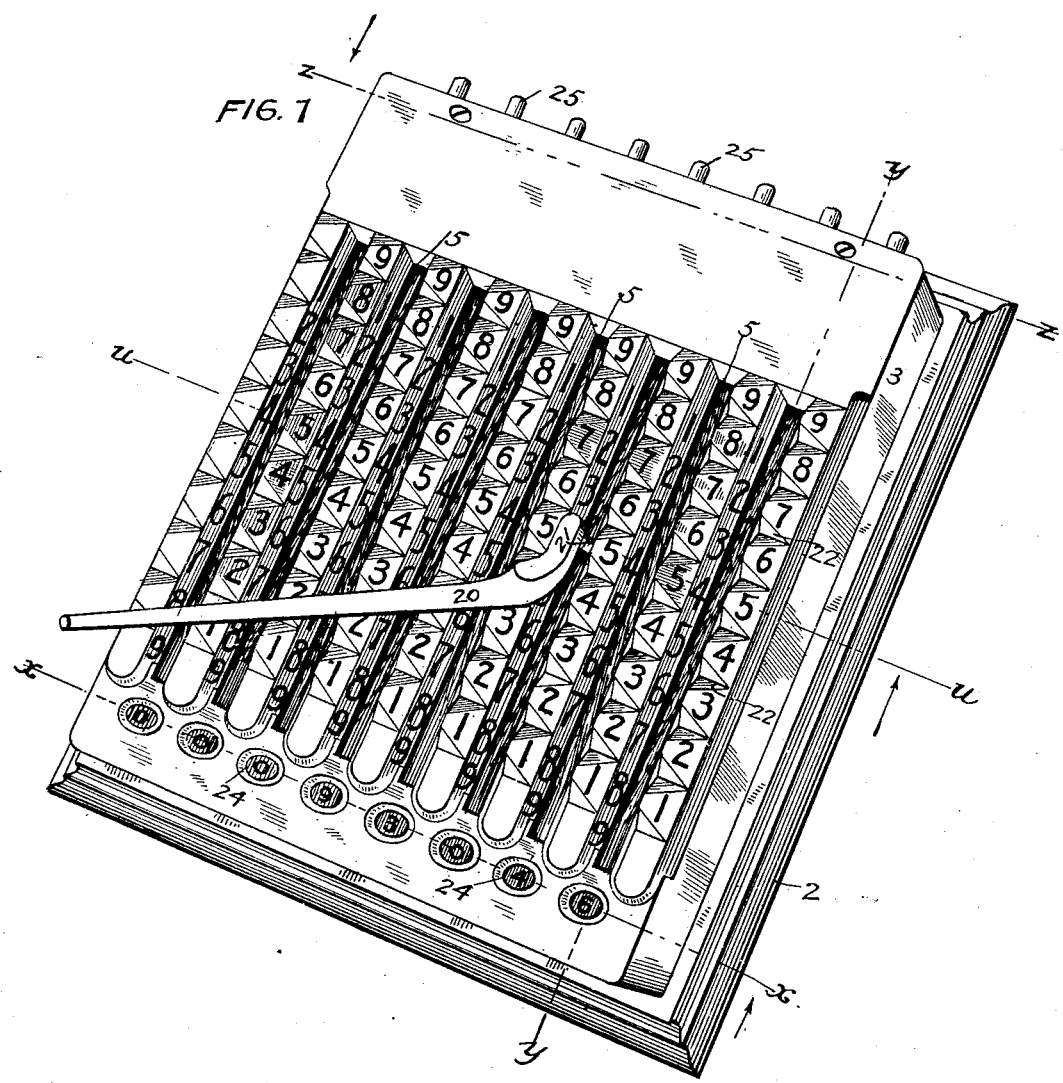

No. 717,125. Patented Dec. 30, 1902.
W. P. SHATTUCK.
CALCULATOR.
(Application filed Sept. 24, 1900. Renewed July 23, 1902.)

(No Model.) 3 Sheets—Sheet 1.

WITNESSES.

INVENTOR.
WILLIAM P. SHATTUCK.
BY Paul O. Hawley
ATTORNEYS.

THE NORRIS PETERS CO., PHOTO-LITHO., WASHINGTON, D. C.

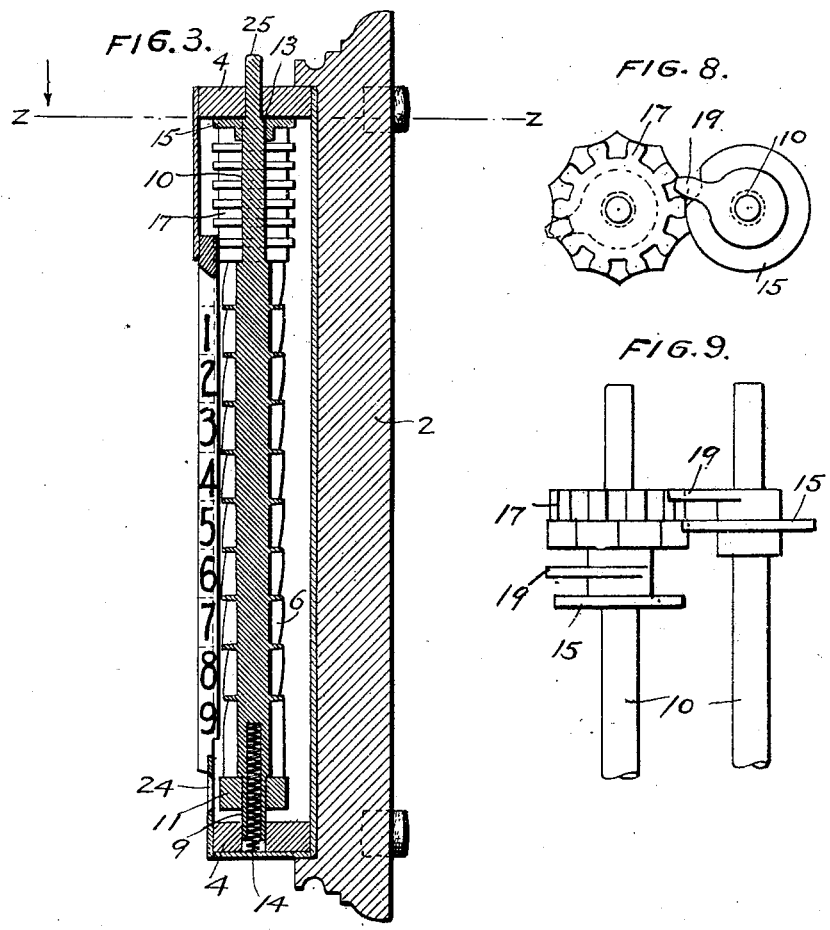
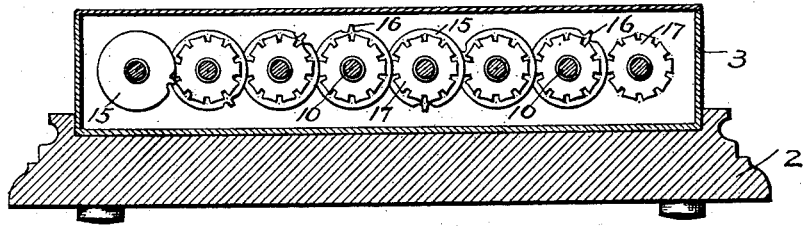

No. 717,125. Patented Dec. 30, 1902.
W. P. SHATTUCK.
CALCULATOR.
(Application filed Sept. 24, 1900. Renewed July 23, 1902.)
(No Model.) 3 Sheets—Sheet 3.

WITNESSES.
J. Jessen.
H. E. Gooley.

INVENTOR.
WILLIAM P. SHATTUCK.
BY Paul O. Hawley
ATTORNEYS.

THE NORRIS PETERS CO., PHOTO-LITHO., WASHINGTON, D. C.

UNITED STATES PATENT OFFICE.

WILLIAM P. SHATTUCK, OF MINNEAPOLIS, MINNESOTA, ASSIGNOR TO THE SHATTUCK MANUFACTURING COMPANY, OF MINNEAPOLIS, MINNESOTA, A CORPORATION.

CALCULATOR.

SPECIFICATION forming part of Letters Patent No. 717,125, dated December 30, 1902.

Application filed September 24, 1900. Renewed July 23, 1902. Serial No. 116,610. (No model.)

*To all whom it may concern:*

Be it known that I, WILLIAM P. SHATTUCK, of the city of Minneapolis, county of Hennepin, and State of Minnesota, have invented certain new and useful Improvements in Calculators, of which the following is a specification.

My invention relates to calculating or computing machines; and the object of my invention is to provide a mechanism by the use of which problems in addition and subtraction may be solved quickly and with absolute accuracy.

A particular object of my invention is to provide a hand-operated calculator, as distinguished from that class of machines which are designed for the same purpose, but have banks of keys through the manipulation of which the registering mechanisms are operated.

A further object of my invention is to provide a calculator of extremely simple construction, in which the parts will be strong and light and very few in number, to the end that the parts may operate with greater certainty and exactness and also in order that the machine may be manufactured and sold at a low price.

My invention consists generally in a figured plate or face in combination with a series of rotary shafts suitably geared together and adapted for operation by a hand-tool, pointer, or pencil; and my invention consists particularly in a group of spiral or spirally-grooved shafts associated with pencil or pointer guides and adapted for rotation by longitudinal movement of a pointer in said guides in combination with suitable means for communicating the movements from one shaft to another and to figured wheels; and the invention further consists in a particular construction and arrangement of the spiral shafts whereby a slight longitudinal movement of a given shaft will disconnect the same from those which represent lower denominations for addition and also permitting backward rotation of the shafts for the purpose of subtraction; and the invention further consists in the various details of construction and in particular combinations of parts, all as hereinafter described, and particularly pointed out in the claims.

The invention will be more readily understood by reference to the accompanying drawings, forming a part of this specification, and in which—

Figure 2:
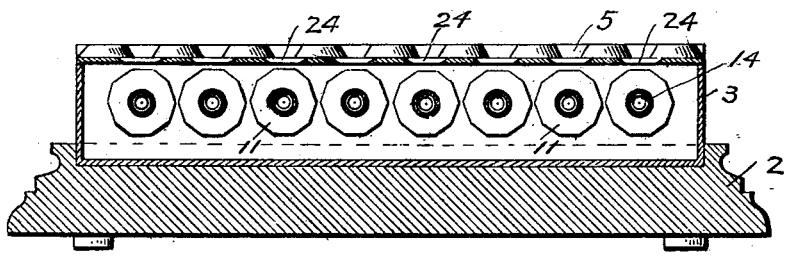
Figure 6:
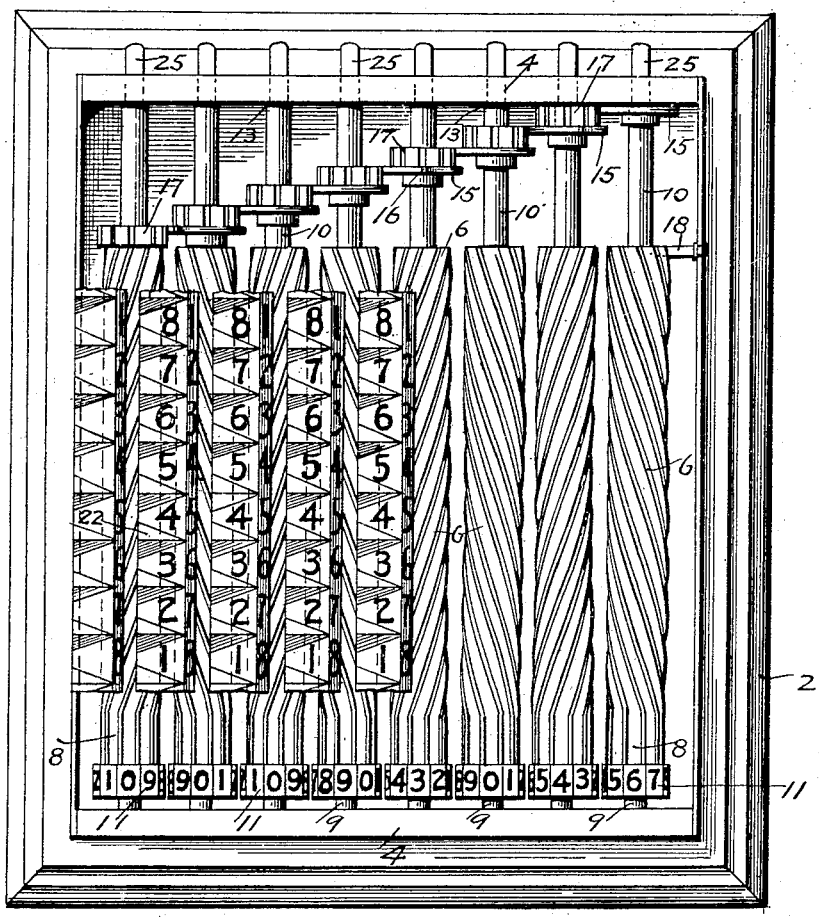
Figure 7:
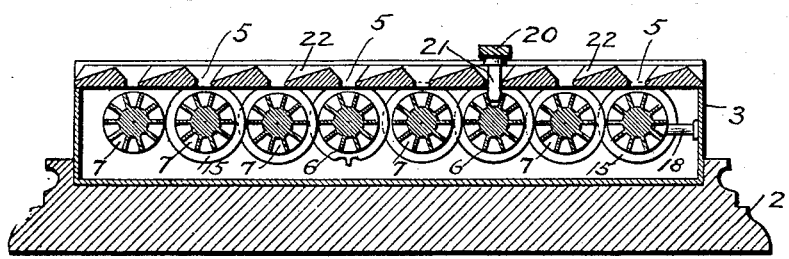

Figure 1 is a perspective view of a calculator embodying my invention. Fig. 2 is a sectional view thereof on the line *x x* of Fig. 1. Fig. 3 is a sectional view on the line *y y* of Fig. 1. Fig. 4 is a sectional view on the line *z z* of Figs. 1 and 3. Fig. 5 shows the pointed or operating tool. Fig. 6 is a plan view of the machine with all but a small portion of the face-plate removed. Fig. 7 is a sectional view on the line *u u* of Fig. 1. Figs. 8 and 9 are end and plan views showing the detailed construction of the shaft ends with modified and additional locking-gears.

Owing to the extraordinarily simple construction of my machine, including, as it does, few parts, which are compactly assembled, it will be evident to any one skilled in the arts that my machine may be so far reduced in size that it may be placed upon the end of a pencil or adapted to be held in the hand and carried in the pocket; but experiments have demonstrated that hand operations are more rapid when not confined to small spaces, and I therefore prefer to make my machine quite wide, with ample spaces between the columns, and of considerable weight, so that when it is placed upon a table or desk it can be manipulated with one hand, leaving the other hand free. It is for this reason that the machine illustrated in the drawings is provided with the heavy base 2, preferably bottomed by a soft pad or rubber feet. I prefer that the base be separate from the box or casing 3, which contains the working parts and which is provided with the heavy ends 4 to carry the shafts. The top of the box or casing is divided into the vertical columns, separated by slots 5, through which the operating-tool works upon the spiral shafts within the casing. There may be any number of columns and corresponding shafts. Each shaft comprises a spiral portion 6, provided with ten spiral grooves 7 7, each making a complete turn about the shaft and preferably terminating in straight grooves 8 8 at the bottom of the shaft. The ends 9 and 10 of the shaft are reduced in size and have bearings in the parts 4 4 of the casing or box. These reduced ends carry the figure-wheel 11 and the transmitting-gear 12, respectively. The upper end of each shaft is provided with a shoulder 13, forming a stop against the piece 4, against which they are held by small springs 14 in the lower ends of the shafts and which bear against the ends of the shaft-holes in the lower part 4 of the casing. As shown in Fig. 3, the shafts are shorter than the space allowed therefor, so that each shaft is capable of a slight longitudinal movement against the pressure of its spring 14. This movement is sufficient to disengage the gear of one shaft from that on the shaft to the right, while leaving it in engagement with the gear upon the next shaft to the left. I prefer to use Geneva-stop intermittent gears upon the shafts, each comprising a locking-disk 15, provided with a single tooth 16, and a ten-tooth gear 17, the teeth of which are provided with concave surfaces which interlock with the locking-disk upon the shaft to the right. The gears 17 are at least twice as wide as the locking-disks in order to permit the longitudinal movement in the manner above specified. The first shaft to the right is provided with a locking-disk only, and the last shaft to the left has only a gear 17. The lock for the first shaft is provided in the form of a fixed pin 18 in the casing, the same entering the spiral grooves when the shaft is in its raised position. Any kind of intermittent gears may be employed; but these Geneva-stop gears absolutely prevent independent movement of the shaft or the overthrowing or overrunning thereof. As an additional preventive against overthrowing I may employ additional gears, as shown in Figs. 8 and 9, the same being provided each with a long tooth 19, adapted to stop against the corners of the opposite gear-teeth.

Referring again to the face of the machine, it will be noted that there are two columns of figures for each slot 5—the one for addition to the right of the slot, and one column for subtraction at the left of the slot, the figures being reversed in order. The pencil, pointer, or operating-tool 20 is provided with a metal point 21, adapted to fit the spiral grooves in the shafts, and in order that this pointer may be quickly, easily, and accurately placed at the right point in the column I prefer to incline the figure-plate and separate the figure-spaces by raised lugs 22, so that the pointer may be placed upon a figure and upon slight pressure being applied thereto will slide off into the slot and onto the spiral shaft at the proper height thereon. The pointer fits the spiral groove snugly, and when the pointer is drawn down in the slot the first effect of its movement is to draw down the shaft against its spring 14 and to disconnect it from the stop 18 in the case of the first shaft or from the locking-disk to the right in the case of any other shaft. Thereafter the downward movement of the pointer or tool causes the shaft to rotate and communicate movement to the shafts at the left until the pointer arrives at the bottom of the slot, where it passes into the straight portion of the groove, so as to leave the shaft in proper position to slip back to place when the tool is withdrawn from the slot. At this time the spring quickly forces the shaft up or back and again interlocks the same with the shaft-gears to the right. The figure-wheels show through the holes 24 at the bottom of the casing. The pressure or drag of the tool in the spiral slot automatically accomplishes the longitudinal movement of the shaft that is required in performing addition; but when it is desired to subtract a number the tool is forced upward in the proper slot, in which case it is obviously necessary to disconnect the gears by other means. To this end I extend the upper end of the shafts through the top of the casing, the same becoming push-bottons or studs 25, by which any given shaft may be first pushed down and then rotated by an upward movement of the tool or pencil. As in other mechanical calculators, problems in division and multiplication are performed by the processes of subtraction and addition.

It is obvious that the number of grooves in each shaft or the number of turns of the single spiral is arbitrary. This number and the number of teeth in the gears is varied according to the relative values of the articles to be counted, such as quarts and gallons, inches, feet, yards, &c., pounds, shilling, pence, or other money values, and so on.

If desired, means may be provided for returning the figure-wheels to zero. Such means would comprise a simple longitudinally-movable rack or bar; but the shafts are so easily returned by the process of subtraction or by the addition of differentials that I have not thought it necessary to show or describe mechanical zero-returning means in detail.

I have also devised an extremely simple printing or listing attachment for this machine, which will be presented in a forthcoming application.

I do not confine my invention to the exact details of construction herein shown and described.

Having thus described my invention, I claim as new and desire to secure by Letters Patent—

1. In a calculator, the combination of a series of spirally-grooved shafts, connected by suitable transfer devices and associated with indicating means, said shafts being capable of rotation through the medium of a suitable tool when moved longitudinally thereof, substantially as described.

2. In a calculator, the combination, with a series of spirally-grooved shafts connected by suitable transfer devices and associated with indicating means, of a columnated frame provided with tool-guides, one for each said shaft, confining the movement of the tool to movement longitudinally of said shaft to rotate the same, and means whereby, upon the rotation of a given shaft by said tool, the relation of said shaft to the other shafts is changed to disconnect the same from the shaft or shafts to the right thereof, substantially as described.

3. In a calculator, the combination, with a plurality of guides, of a plurality of shafts each provided with a plurality of spiral grooves, transfer means connecting the several shafts successively, and said shafts being capable of a slight longitudinal movement prior to rotation, whereby any given shaft may be disconnected from the shaft or shafts to the right thereof, as and for the purpose specified.

4. In a calculator, the combination, with a columnated frame and guides, of a plurality of spirally-grooved shafts, each capable of rotation by a tool moved longitudinally in the corresponding guide, and suitable forwardly-acting transfer means successively connecting and engaging said shafts, whereby movement is communicated from one shaft to the shaft or shafts to the left thereof whether said movement be of a positive or a negative character, while the shaft or shafts to the right is or are undisturbed, and suitable indicating means, substantially as described.

5. In a calculator, the combination, with a suitable columnated frame provided with parallel guides or slots, of related spiral shafts, each capable of a slight longitudinal movement preparatory to rotation, a transfer mechanism connecting the several shafts in succession and adapted for disconnection by the longitudinal movement referred to, and said shafts adapted for both longitudinal movement and rotation by a single operating-tool, substantially as described.

6. In a calculator, the combination, with a suitable columnated frame provided with parallel guides or slots, of related spiral shafts, each capable of a slight longitudinal movement preparatory to rotation, a transfer mechanism connecting the several shafts in succession and adapted for disconnection by the longitudinal movement referred to, and each of said shafts adapted for both longitudinal movement and rotation by the same stroke of a single operating-tool, substantially as described.

7. In a machine of the class described, a figured plate or face in combination with a series of rotary shafts suitably geared together and adapted for operation by a hand-tool, pointer or pencil when moved longitudinally thereof, and value-indicators associated with said shafts, substantially as described.

8. In a calculator of the class described, the combination of a columnated plate provided with tool-guides with a series of shafts parallel with said guides and adapted for rotation by a tool moved longitudinally in respective guides, indicating means and transfer means associated with said shafts, locking means normally in engagement with said shafts, and means preventing the rotation of a shaft or shafts by the rotation of a shaft of higher denomination, substantially as described.

9. In a calculator, the combination of a guide-plate with a plurality of shafts for rotation by a tool operating longitudinally thereof, interlocking and transfer devices associated with said shafts, and all of said shafts being incapable of rotation by said tool until a selected shaft is moved to disengage the same from the locking device to the right thereof, substantially as described.

10. In a calculator, the combination, with a suitable frame, of a plurality of shafts, each capable of rotative and non-rotative movement by means of a suitable tool, indicating means, locking devices dependent upon said non-rotative movement, and transfer devices dependent upon said rotative movement, substantially as described.

11. In a calculator, the combination, with a suitable frame, of a plurality of shafts, each capable of rotative and non-rotative movement by means of a suitable tool, indicating means, interlocking and justifying devices dependent upon said non-rotative movement, and transfer devices dependent upon said rotative movement, substantially as described.

12. In a calculator, the combination of a guide-frame with a series of revoluble members, each provided with a plurality of worm-teeth or spirals, corresponding figures upon said frame, interlocking transfer devices for the communication of movement from one shaft to the shaft or shafts of a higher denomination only, and indicating means, substantially as described.

13. In a calculator, the combination, with a guide-frame, of a plurality of worm or spiral shafts provided with interlocking gears in constant engagement throughout said shafts serially, transfer means, and said shafts being revoluble only after a non-rotary movement of one thereof, substantially as described.

14. In a calculator, the combination of a series of rotary members, each provided with a given number of divisions, tool-guides for said members and wherein said members are exposed for engagement, at any point or division, by the tool, to be proportionally operated thereby, and suitable indicating means, substantially as described.

15. In a calculator, the combination of a series of spiral shafts occupying the same plane, and respective tool-guides therefor, with an indicating-wheel upon each shaft, and transfer means connecting said shafts, substantially as described.

16. In a calculator, the combination of a series of members, each having a plurality of spirals, with parallel tool-guides for said members and opposite which said spirals are exposed, transfer devices connecting said members, and interlocking means jointly operable with said members, substantially as described.

17. In a calculator, the combination of a series of members revoluble in suitable bearings and each provided with a plurality of spirals, terminating in straight, justifying portions, tool-guides for said members, transfer devices and indicating means, substantially as described.

18. In a calculator, the combination of a series of members, each provided with a plurality of spirals terminating in justifying portions, said members being capable of both longitudinal and rotary movement, interlocking means, transfer devices and indicating means, and each said member being adapted to be moved longitudinally, rotated and justified by a single, parallel stroke or sweep of a suitable tool in its guide, substantially as described.

19. In a calculator, the combination, with a suitable tool-guide, of a series of members parallel therewith and adapted for movement by a tool sliding thereon, indicating means and transfer devices, substantially as described.

20. In a calculator, the combination of a suitable frame provided with parallel guides with a series of spiral shafts operable by a tool sliding in said guides, the spirals of adjacent shafts being of opposite direction, intermittent gears provided upon said shafts, and indicating-wheels also provided thereon, substantially as described.

21. In a calculator, the combination, with a suitable frame provided with a plurality of guides, of a plurality of spiral shafts, the spirals of which are alternated in direction, and all of which terminate in straight, justifying portions, transfer devices and indicating means, substantially as described.

22. In a calculator, the combination of a suitable frame provided with a series of guides, with a series of shafts, each provided with a plurality of spiral grooves terminating in straight portions, and the spirals of adjacent shafts being of opposite direction, intermittent gears upon and successively connecting said shafts, each said shaft being adapted for slight longitudinal movement to disengage its gear from the one upon the next shaft to the right, whereby, as a tool is applied to a shaft to rotate the same, said shaft is first moved longitudinally and then rotated, substantially as described.

23. In a calculator, the combination of a suitable frame provided with a series of guides, with a series of shafts having bearings in said frame, said shafts being parallel with said guides and each said shaft having a plurality of spiral grooves terminating in straight, justifying portions, interlocking and transfer devices upon the said shafts successively connecting and engaging the same, said shafts being adapted for longitudinal movement as well as rotation by a tool operated in respective guides, and springs for returning said shafts longitudinally, substantially as described.

24. In a calculator, the combination of a suitable frame provided with a series of guides, with a series of spiral shafts parallel to respective guides, said shafts being both revolubly and longitudinally movable in bearings in said frame, and provided with knobs upon the exterior of said frame, and each of said shafts being provided with an intermittent gear and an indicating-wheel, substantially as described.

25. In a calculator, the combination of a frame provided with a series of guides, with a series of shafts, each provided with a plurality of spiral grooves to receive an operating-tool in a respective guide, said grooves being of a width to receive said tool but prevent the same from engaging with the bottoms thereof, interlocking transfer devices upon said shafts, said shafts being capable of both longitudinal and rotary movement by said tool, and indicating means, substantially as described.

26. In a calculator, the combination, with a series of guides, each provided with a series of tool inclines or chutes, of a series of shafts, each provided with a plurality of spirals, and transfer and indicating means, substantially as described.

In testimony whereof I have hereunto subscribed my name this 10th day of September, 1900.

WM. P. SHATTUCK.

In presence of—
  C. G. HAWLEY,
  M. C. NOONAN.